H. STEUBING.
Beer Cooler.
No. 40,200.  Patented Oct. 6, 1863.
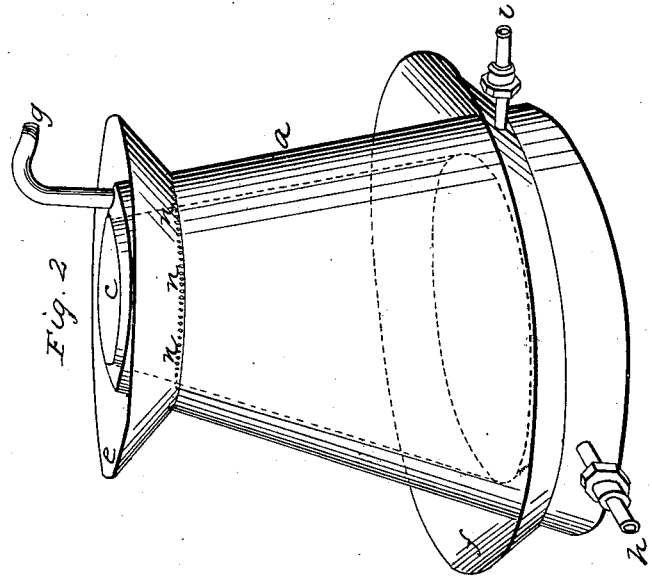
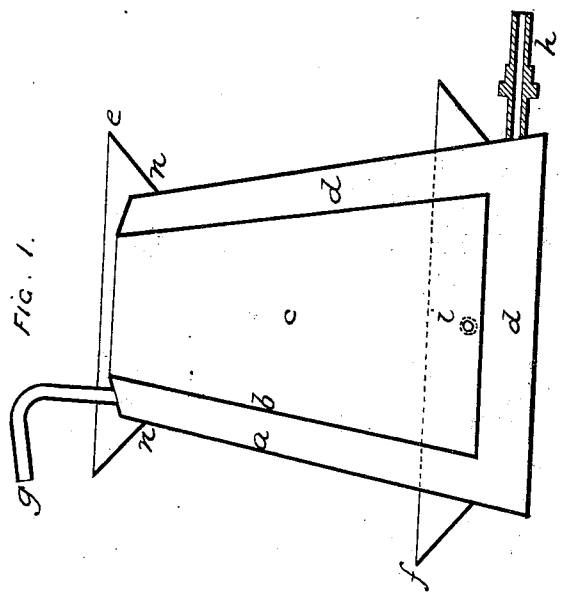
ATTEST
INVENTOR.

UNITED STATES PATENT OFFICE.

HENRY STEUBING, OF NEW YORK, N. Y.

IMPROVED APPARATUS FOR COOLING BEER OR OTHER LIQUIDS.

Specification forming part of Letters Patent No. 40,200, dated October 6, 1863.

*To all whom it may concern:*

Be it known that I, HENRY STEUBING, of the city, county, and State of New York, have invented a new and Improved Method of Cooling Beer, Ale, and other Liquids; and I hereby declare the following to be a full, clear, and exact description thereof, reference being had to the annexed drawings, making a part of this specification, in which—

Figure 1 is a vertical section; Fig. 2, a perspective view of the apparatus for cooling.

The same letters mark the same parts in both figures.

The nature of my invention consists in cooling the liquid by causing its contact with the inner and outer surface of the vessel containing ice-water, as hereinafter described.

To enable others skilled in the art to make and use my invention, I will proceed to describe its construction and operation.

In the annexed drawings, C represents a hollow cylinder or similar hollow figure, open on the top, surrounded by a double mantel, $a$ and $b$, and double bottom, thus forming a hollow, $d$, around the same, except on the top.

$e$ represents a flange near the top of the outer mantel, $a$, containing small round holes $n\ n\ n$ close to the said mantel.

$f$ represents a flange near the bottom of the apparatus, containing a pipe, $i$, leading the ale or other liquid out of the apparatus.

$h$ represents a pipe leading the cold water from a reservoir, (not shown in the drawings,) which is placed somewhat higher than the cooler, so as to create a pressure into the space $d$, formed by the double mantel; and $g$ represents a pipe from the top of $d$, carrying the cold water, already used, out of the apparatus.

The said apparatus is used in the following manner: Cold water or iced water is introduced into the space $d$ from a reservoir, until the space $d$ is filled with it and during the whole time of cooling. Then the ale, beer, or other liquid to be cooled is admitted into the hollow cylinder $c$ steadily and continuously, when the same will overflow into the space formed by the flange $e$, and will flow down through the holes $n\ n\ n$ on the outer mantel, $a$, into the space formed by the lower flange, $f$, after which it flows out of the apparatus through the pipe $i$. Thus it will be seen that a certain quantity of iced water or cold water cools the ale, beer, or other liquid, first by its contact on the inside $b$ of the cooler, and then by its contact on the outside $a$ of said cooler, thereby effecting a great saving of the cooling material.

The cooler is made of thin metal.

What I claim as new, and desire to secure by Letters Patent, is—

The apparatus, substantially as described.

HENRY STEUBING.

Witnesses:
CHS. WEHLE,
A. WEHLE.